(12) United States Patent
Newald

(10) Patent No.: US 8,413,017 B2
(45) Date of Patent: Apr. 2, 2013

(54) METHOD FOR TRANSMITTING A DATA TRANSFER BLOCK AND METHOD AND SYSTEM FOR TRANSFERRING A DATA TRANSFER BLOCK

(75) Inventor: Josef Newald, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 138 days.

(21) Appl. No.: 12/308,488

(22) PCT Filed: Sep. 25, 2007

(86) PCT No.: PCT/EP2007/060144
§ 371 (c)(1),
(2), (4) Date: Jul. 28, 2010

(87) PCT Pub. No.: WO2008/052849
PCT Pub. Date: May 8, 2008

(65) Prior Publication Data
US 2010/0293443 A1    Nov. 18, 2010

(30) Foreign Application Priority Data
Oct. 31, 2006 (DE) .......................... 10 2006 051 866

(51) Int. Cl.
*G11C 29/00* (2006.01)
(52) U.S. Cl. .......................... 714/766; 714/758; 714/807
(58) Field of Classification Search .................. 714/758, 714/766, 799, 807
See application file for complete search history.

(56) References Cited

U.S. PATENT DOCUMENTS

| | | | |
|---|---|---|---|
| 5,594,743 A * | 1/1997 | Park | 714/767 |
| 5,996,107 A * | 11/1999 | Tomisawa | 714/766 |
| 6,148,422 A * | 11/2000 | Strawczynski et al. | 714/704 |
| 6,959,411 B2 * | 10/2005 | Lin | 714/763 |
| 7,110,457 B1 * | 9/2006 | Chen et al. | 375/240.25 |

(Continued)

FOREIGN PATENT DOCUMENTS

| | | |
|---|---|---|
| EP | 1355456 | 10/2003 |
| EP | 1355456 A1 * | 10/2003 |

(Continued)

OTHER PUBLICATIONS

International Search Report, PCT International Patent Application No. PCT/EP2007/060144, dated Jan. 4, 2008.

*Primary Examiner* — Yolanda L Wilson
(74) *Attorney, Agent, or Firm* — Kenyon & Kenyon LLP

(57) ABSTRACT

A method for transmitting a data transfer block, the data transfer block comprising at least one data segment having a predetermined number of one or more data units, to be identified using validity information, and a header segment, the method including the following steps: a) writing a data unit into a first area of an output register predetermined for the data segment, from which the buffered data transfer block is transmitted via a bus system at a predetermined transmission instant with the aid of a time multiplexing method; b) writing a validity datum, implemented as a toggle bit or as an N-bit counter, into a second area of the output register predetermined for the header segment, the particular validity datum specifying the validity of the corresponding written data unit; c) enabling the data transfer block buffered in the output register for transmission, after the particular data unit and the corresponding validity datum are written into the output register; d) repeating steps (a) through (c) until the predetermined number of the data units and the corresponding validity data are written or the predetermined transmission instant is reached; and e) transmitting the enabled data transfer block buffered in the output register at the transmission instant.

18 Claims, 3 Drawing Sheets

U.S. PATENT DOCUMENTS

| | | | |
|---|---|---|---|
| 7,278,085 B1 * | 10/2007 | Weng et al. | 714/766 |
| 7,380,198 B2 * | 5/2008 | Judd | 714/766 |
| 7,712,004 B1 * | 5/2010 | Campbell et al. | 714/746 |
| 7,782,905 B2 * | 8/2010 | Keels et al. | 370/474 |
| 7,805,658 B2 * | 9/2010 | Luk et al. | 714/766 |
| 2002/0038443 A1 * | 3/2002 | Iwata et al. | 714/766 |
| 2004/0194007 A1 * | 9/2004 | Hocevar | 714/801 |
| 2005/0132263 A1 * | 6/2005 | Anderson et al. | 714/766 |
| 2008/0250307 A1 * | 10/2008 | Lin | 714/807 |

FOREIGN PATENT DOCUMENTS

| | | |
|---|---|---|
| JP | 63-42545 | 2/1988 |
| JP | 7-312600 | 11/1995 |
| JP | 11-261536 | 9/1999 |
| JP | 2003-273950 | 9/2003 |
| JP | 2005-513959 | 5/2005 |
| JP | 2005-328119 | 11/2005 |

* cited by examiner

METHOD FOR TRANSMITTING A DATA TRANSFER BLOCK AND METHOD AND SYSTEM FOR TRANSFERRING A DATA TRANSFER BLOCK

FIELD OF THE INVENTION

The present invention relates to a method for transmitting a data transfer block and a method and a system for transferring data transfer blocks, in particular with the aid of a FlexRay bus.

BACKGROUND INFORMATION

The FlexRay bus and the associated FlexRay protocol are described, for example, in European Patent No. EP 1 355 456 A1.

According to the FlexRay protocol, which operates using a time multiplexing method, frames or data transfer blocks are transmitted in a communication cycle having a static segment and/or a dynamic segment.

Here, the terms frame, data frame, data transfer block, communication, and message are used synonymously and identify the same thing.

A data transfer block contains a header segment (header), a data segment (payload), and a checksum segment (CRC data). A data segment contains one or more data units, which may also be of different sizes. The data transfer block is transferred from a first transceiver device or node, which is coupled to the FlexRay bus, to a second transceiver device or node, which is also coupled to the FlexRay bus.

A validity bit may be provided in each case to indicate whether current or obsolete data are being transmitted at the location of the corresponding data unit into the data transfer block. A validity bit set to one indicates that the corresponding data unit is valid. In contrast, a validity bit set to zero indicates that the corresponding data unit is invalid.

In any case, all validity bits of a data transfer block must be erased before renewed writing and subsequent transmission, to prevent invalid data units which have corresponding validity bits still having a one from being transmitted. A problem may arise in particular on the receiver side if it was not possible to erase a validity bit which was to have been erased in a timely manner before the transmission. Undetectable errors may arise in this way on the receiver side.

SUMMARY

An example method and system according to the present invention for transmitting a data transfer block may have the advantage that erasing the particular typical validity bit may be dispensed with. The complex management of erasing the validity bit also does not have to be performed according to the present invention.

Furthermore, according to the present invention, a reliable statement may always be made on the receiver side as to whether a data unit of a received data transfer block has valid or invalid data.

The present invention includes providing respectively a validity datum for predetermined data units, which are to be equipped with validity information because of their significance, their security relevance, or the like, the validity datum containing history information which indicates a change in the validity datum, in particular after a new write operation of the corresponding data unit.

According to the present invention, a toggle bit or an N-bit counter are proposed as embodiments of the validity datum, which are both suitable for also providing history information in addition to the validity information for the corresponding data unit.

A method for transmitting a data transfer block is accordingly provided, the data transfer block having at least one data segment having a predetermined number of one or more data units, to be identified using validity information, and a header segment, the method containing the following steps:

a) Writing a data unit into a first area of an output register predetermined for the data segment, from which the buffer data transfer block is transmitted via a bus system at a predetermined transmission instant using a time multiplexing method;

b) Writing a validity datum, implemented as a toggle bit or as an N-bit counter, into a second area of the output register predetermined for the header segment, the particular validity datum indicating the validity of the corresponding written data unit. The header segment may be situated in the payload area and/or in the header area of the FlexRay frame;

c) Enabling the data transfer block buffered in the output register for transmission, after the particular data unit and the corresponding validity datum have been written into the output register;

d) Repeating steps (a) through (c) until the predetermined number of data units and the corresponding validity data have been written or the predetermined transmission instant is reached; and e) Transmitting the enabled data transfer block buffered in the output register at the transmission instant.

Furthermore, a method for transferring data transfer blocks is provided which has the following steps:

Transmitting a data transfer block with the aid of a first transceiver device according to the method described above for transmitting a data transfer block;

Receiving the transmitted data transfer block with the aid of a second transceiver device, which is coupled with the aid of a bus system to the first transceiver device;

Checking the validity data contained in the received data transfer block; and

Extracting and storing the data units whose associated validity data are valid, and discarding the data units whose associated validity datum is invalid, by the second transceiver device.

In addition, a system for transferring a data transfer block is provided, the data transfer block having at least one data segment having a predetermined number of one or more data units to be identified using validity information and a header segment, using:

a first transceiver device, which is suitable for performing a method for transmitting a data transfer block;

a bus system, which couples the first transceiver device to at least one second transceiver device; and the second transceiver device, which has:

a first component, which receives the data transfer block transmitted by the first transceiver device;

a second component, which checks the validity data contained in the received data transfer block; and a third component, which is suitable for extracting and storing the data units whose associated validity datum is valid and discarding the data units whose associated validity datum is invalid.

According to a preferred refinement of the present invention, the data transfer block has a checksum segment, a checksum being calculated over at least one predetermined part of the data segment and/or the header segment and the calculated checksum being stored in a third area of the output buffer predetermined for the checksum segment. The checksum is a CRC checksum (CRC: cyclic redundancy check), for example. CRC checksums are used in particular in error recognition. Theoretically, they may also be used for error correction; however, the Hamming distance in the FlexRay protocol is typically insufficient and the effort is very high for this purpose.

According to a preferred embodiment of the present invention, the bus system is implemented as a FlexRay bus system.

According to a further preferred embodiment, the validity datum is implemented as the toggle bit, the particular toggle bit being switched over upon each writing of the corresponding data unit. The toggle bit is thus alternately set to the value 0 and then to the value 1 after each write operation. Accordingly, the value 0 and then the value 1 are alternately interpreted as valid. The significance of the toggle bit is thus periodically inverted. Those errors in which the validity datum has a predetermined value over a longer period of time independently of the written corresponding data unit may advantageously be recognized due to the embodiment of the toggle bit.

According to a further preferred embodiment, the validity datum is implemented as the N-bit counter, the particular N-bit counter being incremented or decremented by a predetermined counter range upon each writing of the corresponding data unit. Greater security results because of the resulting redundancy due to the N-bits. For example, with an 8-bit counter, the security is increased by a factor of approximately 250. The particular N-bit counter is preferably incremented or decremented by one upon each writing of the corresponding data unit.

According to a further preferred embodiment, the N-bit counters for the various data units are each initialized using a different initialization value. The various N-bit counters may thus be differentiated well from one another.

According to a further preferred refinement, in which the validity datum is implemented as the N-bit counter, the particular N-bit counter is incremented or decremented by a predetermined counter range with the aid of the first transceiver device upon each writing of the corresponding data unit and the particular count of the N-bit counter is stored with the aid of a memory device of the second transceiver device. The second transceiver device, which receives the data transfer block transmitted by the first transceiver device, may thus advantageously compare the current value of the N-bit counter to the prior value of the N-bit counter and thus establish a potential change thereof.

According to a further preferred refinement, the second transceiver device has a memory device, which is suitable for storing the count of a validity datum implemented as an N-bit counter in each case.

According to a further preferred refinement, in which the bus system is implemented as a FlexRay bus system, the first transceiver device and/or the second transceiver device have a FlexRay communication control device.

BRIEF DESCRIPTION OF THE DRAWINGS

Exemplary embodiments of the present invention are illustrated in the figures and explained in greater detail below.

DETAILED DESCRIPTION OF EXAMPLE EMBODIMENTS

Figure 1:
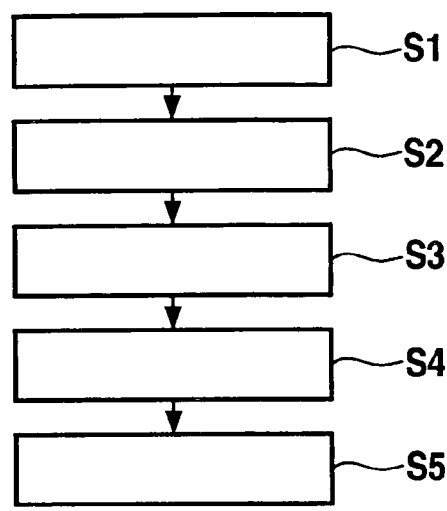
FIG. 1 shows a schematic flow chart of a first exemplary embodiment of the method according to the present invention.

Identical reference numerals identify identical or functionally identical components in the figures.

FIG. 1 shows a schematic flow chart of a first exemplary embodiment of the method according to the present invention for transmitting a data transfer block DB. Data transfer block DB has at least one data segment DS having a predetermined number of one or more data units DE1 through DEn to be identified using validity information and a header segment KS (see FIG. 2).

Figure 2:
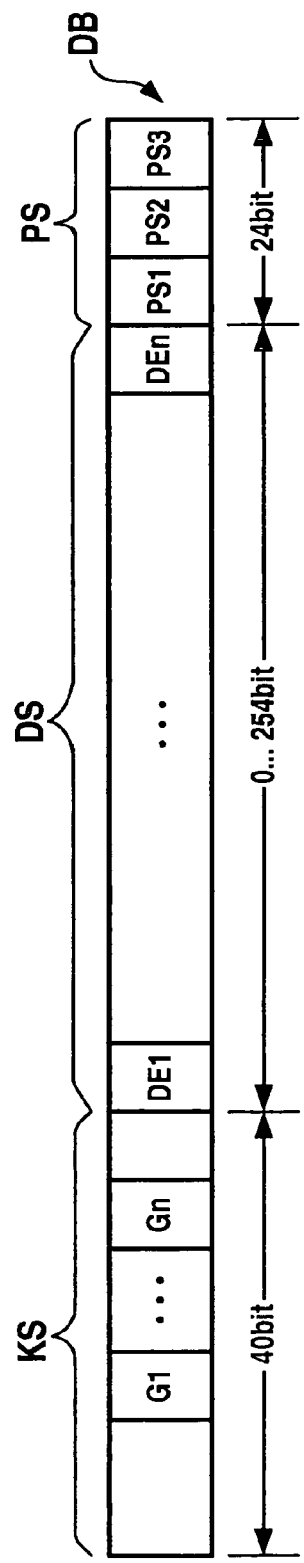
FIG. 2 shows a schematic block diagram of a preferred exemplary embodiment of the format of the data transfer block according to the present invention.
Figure 4:
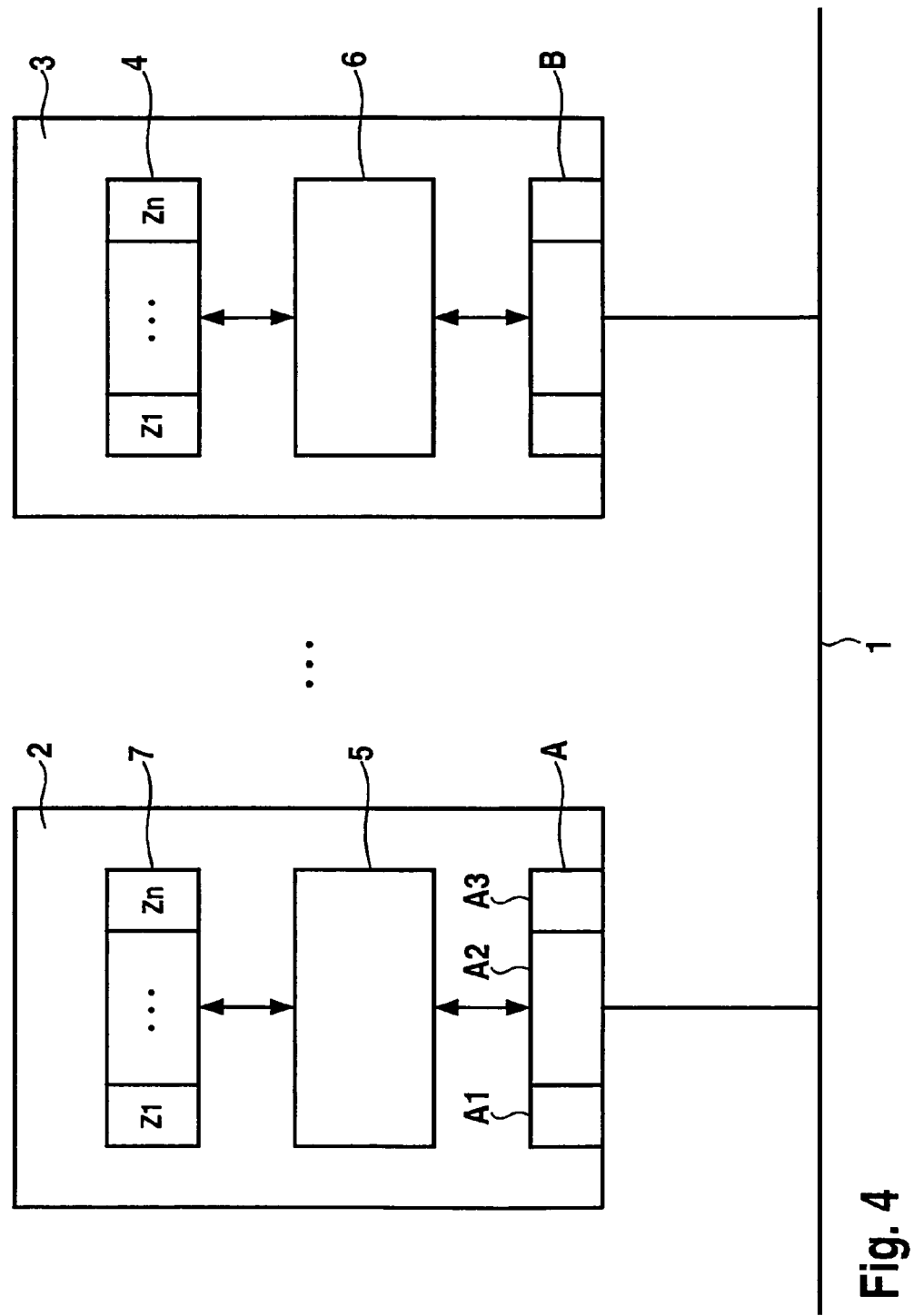
FIG. 4 shows a schematic block diagram of a preferred exemplary embodiment of the system for transferring data transfer blocks according to the present invention.

The method according to the present invention is described hereafter on the basis of the block diagram in FIG. 1 with reference to the schematic block diagram of the format of data transfer block DB according to FIG. 2 and with reference to the schematic block diagram of the system according to FIG. 4. The first exemplary embodiment of the method according to the present invention according to FIG. 1 has the following method steps S1 through S5:

Method Step S1:

A data unit DE1 through DEn is written into a first area A1 of an output buffer A predetermined for data segment DS, from which buffered transfer block DB is transmitted at a predetermined transmission instant using a time multiplexing method via a bus system 1. Data transfer block DB may also have, in addition to one or more data units to be identified using validity information, other data units not to be secured. Bus system 1 is preferably a FlexRay bus system.

Method Step S2:

Validity datum G1 through Gn, implemented as a toggle bit or as an N-bit counter, is written into a second area A2 of output buffer A predetermined for header segment KS, particular validity datum G1 through Gn indicating the validity of corresponding written data unit DE1 through DEn.

According to a first alternative of the present invention, validity datum G1 through Gn may be implemented as a toggle bit, the particular toggle bit being switched over upon each writing of corresponding data unit DE1 through DEn. As a second alternative of the present invention, validity datum G1 through Gn may be implemented as an N-bit counter, the particular N-bit counter being incremented or decremented by a predetermined counter range upon each writing of corresponding data unit DE1 through DEn.

The N-bit counters for various data units DE1 through DEn are preferably each initialized using a different initialization value in such a way that they may be differentiated. In particular, the particular N-bit counter is incremented or decremented by one upon each writing of corresponding data unit DE1 through DEn.

Method Step S3:

Data transfer block DB buffered in output buffer A is enabled for transmission after particular data unit DE1 through DEn and corresponding validity datum G1 through Gn have been written into output buffer A.

Method Step S4:

Method steps S1 through S3 are repeated until the predetermined number of data units DE1 through DEn and corresponding validity data G1 through Gn have been written or the predetermined transmission instant, which is defined by the time multiplexing method, is reached.

Method Step S5:

Enabled data transfer block DB buffered in output buffer A is transmitted via bus system 1 at the transmission instant.

Figure 3:
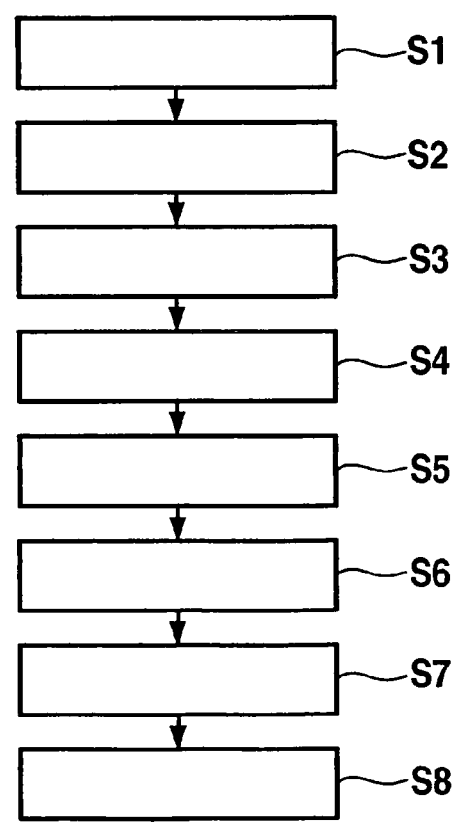
FIG. 3 shows a schematic flow chart of a second exemplary embodiment of the method according to the present invention.

A schematic flow chart of a second exemplary embodiment of the method according to the present invention is shown in FIG. 3. The second exemplary embodiment according to FIG. 3 has method steps S1 through S8. Method steps S1 through S5 according to FIG. 3 correspond to method steps S1 through S5 according to FIG. 1. For reasons of clarity, they are not described again. The second exemplary embodiment of the method according to the present invention according to FIG. 3 thus has method steps S1 through S5, which have already been explained in detail with reference to FIG. 1, and the following method steps S6 through S8.

Method Step S6:

Data transfer block DB transmitted by first transceiver device 2 is received by a second transceiver device 3. For this purpose, first transceiver device 2 is coupled to second transceiver device 3 with the aid of a bus system 1.

Method Step S7:

Validity data G1 through Gn contained in received data transfer block DB are checked for their validity.

Method Step S8:

Those data units DE1 through DEn whose associated validity datum G1 through Gn is valid are extracted and stored. Those data units DE1 through DEn whose associated validity datum G1 through Gn is invalid are preferably discarded.

Preferably, if validity datum G1 through Gn is implemented as the N-bit counter, the particular N-bit counter is incremented or alternatively decremented by a predetermined counter range with the aid of first transceiver device 2 upon each writing of corresponding data unit DE1 through DEn and the particular count of the N-bit counter is stored with the aid of a memory device 4 of second transceiver device 3.

FIG. 4 shows a schematic block diagram of a preferred exemplary embodiment of the system for transferring data transfer blocks DB, which each have at least one data segment DS having a predetermined number of one or more data units DE1 through DEn to be identified using validity information and a header segment KS. The system according to FIG. 4 has a predetermined number of transceiver devices 2, 3, which are coupled to one another via a bus system 1. Without restricting the generality, only a first transceiver device 2 and a second transceiver device 3 are shown in FIG. 4.

First transceiver device 2 is suitable for performing a method for transmitting a data transfer block as described in FIG. 1.

Second transceiver device 3 has at least one first component, one second component, and one third component. The first component is suitable for receiving data transfer block DB transmitted by first transceiver device 2. The second component is suitable for checking validity data G1 through Gn contained in received data transfer block DB. Furthermore, the third component is suitable for extracting and storing data units DE1 through DEn whose associated validity datum G1 through Gn is valid, and in particular discarding those data units DE1 through DEn whose associated validity datum is invalid.

Second transceiver device 3 preferably has a memory device 4, which is suitable for storing a count Z1 through Zn of validity datum G1 through Gn implemented as an N-bit counter in each case. Second transceiver device 3 is thus enabled to compare particular count Z1 through Zn of the particular N-bit counter of currently received data unit DE1 through DEn to the N-bit counter of previously received data unit DE1 through DEn.

First transceiver device 2 and second transceiver device 3 preferably have a FlexRay communication control device 5, 6. First FlexRay communication control device 5 is suitable in particular for controlling output buffer A and a second memory device 7, which preferably buffers particular counts Z1 through Zn. Second FlexRay communication control device 6 is suitable in particular for controlling an input buffer B and first memory device 4.

Although the present invention was described above on the basis of the preferred exemplary embodiments, it is not restricted thereto, but rather is modifiable in many ways.

What is claimed is:

1. A method for transmitting a data transfer block which has at least one data segment having a predetermined number of one or more data units to be identified using validity information, and a header segment, the method comprising:
   a) writing a data unit into a first area of an output register predetermined for a data segment, from which a buffered data transfer block is transmitted via a bus system at a predetermined transmission instant with the aid of a time multiplexing method;
   b) writing a validity datum, implemented as a toggle bit or as an N-bit counter, into a second area of the output register predetermined for a header segment, the validity datum specifying a validity of the corresponding written data unit;
   c) enabling the data transfer block buffered in the output register for transmission after the data unit and the corresponding validity datum have been written into the output register;
   d) repeating steps (a) through (c) until one of i) the predetermined number of the data units and the corresponding validity data have been written, or ii) a predetermined transmission instant is reached; and
   e) transmitting the enabled data transfer block buffered in the output register at the transmission instant;
   wherein the toggle bit is alternately switched between the values 0 and 1 after each writing of a corresponding data unit.

2. The method as recited in claim 1, wherein the data transfer block has a checksum segment, a checksum being calculated over at least a predetermined part of at least one of the data segment and the header segment, and the calculated checksum being stored in a third area of the output register predetermined for the checksum segment.

3. The method as recited in claim 1, wherein the validity datum is implemented as the toggle bit, the toggle bit being switched over upon each writing of the corresponding data unit.

4. A method for transmitting a data transfer block which has at least one data segment having a predetermined number of one or more data units to be identified using validity information, and a header segment, the method comprising:
   a) writing a data unit into a first area of an output register predetermined for a data segment, from which a buffered data transfer block is transmitted via a bus system at a predetermined transmission instant with the aid of a time multiplexing method;
   b) writing a validity datum, implemented as a toggle bit or as an N-bit counter, into a second area of the output register predetermined for a header segment, the validity datum specifying a validity of the corresponding written data unit;

c) enabling the data transfer block buffered in the output register for transmission after the data unit and the corresponding validity datum have been written into the output register;
d) repeating steps (a) through (c) until one of i) the predetermined number of the data units and the corresponding validity data have been written, or ii) a predetermined transmission instant is reached; and
e) transmitting the enabled data transfer block buffered in the output register at the transmission instant;
wherein the validity datum is implemented as the N-bit counter, the N-bit counter being incremented or decremented by a predetermined counter range upon each writing of the corresponding data unit.

5. The method as recited in claim 4, wherein the N-bit counters for the data units are each initialized using a different initialization value.

6. The method as recited in claim 4, wherein the N-bit counters are each incremented or decremented by one upon each writing of the corresponding data unit.

7. A method for transferring data transfer blocks, comprising:
transmitting a data transfer block using a first transceiver device, the data transfer block including at least one data unit and at least one validity datum, each of the at least one validity datum corresponding to a different one of the at least one data unit, each of the validity datum being one of a toggle bit or a count of an N-bit counter;
receiving the transmitted data transfer block using a second transceiver device, which is coupled to the first transceiver device via a bus system;
checking the validity data contained in the received data transfer block; and
extracting and storing the data units whose associated validity datum is valid, and discarding the data units whose associated validity datum is invalid, using the second transceiver device;
wherein the toggle bit is alternately switched between the values 0 and 1 after each writing of a corresponding data unit.

8. A method for transferring data transfer blocks, comprising:
transmitting a data transfer block using a first transceiver device, the data transfer block including at least one data unit and at least one validity datum, each of the at least one validity datum corresponding to a different one of the at least one data unit, each of the validity datum being one of a toggle bit or a count of an N-bit counter;
receiving the transmitted data transfer block using a second transceiver device, which is coupled to the first transceiver device via a bus system;
checking the validity data contained in the received data transfer block; and
extracting and storing the data units whose associated validity datum is valid, and discarding the data units whose associated validity datum is invalid, using the second transceiver device;
wherein the validity datum is implemented via the N-bit counter, the N-bit counter being incremented or decremented by a predetermined counter range using the first transceiver device upon each writing of the corresponding data unit, and a corresponding count of the N-bit counter being stored using a memory device of the second transceiver device.

9. A system for transferring a data transfer block, which has at least one data segment having a predetermined number of one or more data units to be identified using validity information, and a header segment, comprising:
a first transceiver device, which is adapted to a data transfer block, the data transfer block including at least one data unit and at least one validity datum, each of the at least one validity datum corresponding to a different one of the at least one data unit, each of the validity datum being one of a toggle bit or a count of an N-bit counter;
a bus system which couples the first transceiver device to at least one second transceiver device; and
the second transceiver device which includes a first component, adapted to receive the data transfer block transmitted by the first transceiver device, a second component adapted to check the validity data contained in the received data transfer block, and a third component adapted to extract and store the data units whose associated validity datum is valid, and to discard the data units whose associated validity datum is invalid;
wherein the toggle bit is alternately switched between the values 0 and 1 after each writing of a corresponding data unit.

10. The system as recited in claim 9, wherein the second transceiver device has a memory device which is suitable for storing a count of the validity datum implemented via an N-bit counter.

11. The system as recited in claim 10, wherein the bus system is implemented as a FlexRay bus system and wherein at least one of the first transceiver device and the second transceiver device has a FlexRay communication control device.

12. The system as recited in claim 9, wherein the bus system is implemented as a FlexRay bus system and wherein at least one of the first transceiver device and the second transceiver device has a FlexRay communication control device.

13. The system as recited in claim 9, wherein the bus system is implemented as a FlexRay bus system, and wherein at least one of the first transceiver device and the second transceiver device has a FlexRay communication control device.

14. A method for transmitting a data transfer block which has at least one data segment having a predetermined number of one or more data units to be identified using validity information, and a header segment, the method comprising:
a) writing a data unit into a first area of an output register predetermined for a data segment, from which a buffered data transfer block is transmitted via a bus system at a predetermined transmission instant with the aid of a time multiplexing method;
b) writing a validity datum, implemented as a toggle bit or as an N-bit counter, into a second area of the output register predetermined for a header segment, the validity datum specifying a validity of the corresponding written data unit;
c) enabling the data transfer block buffered in the output register for transmission after the data unit and the corresponding validity datum have been written into the output register;
d) repeating steps (a) through (c) until one of i) the predetermined number of the data units and the corresponding validity data have been written, or ii) a predetermined transmission instant is reached; and
e) transmitting the enabled data transfer block buffered in the output register at the transmission instant;
wherein the data transfer block has a checksum segment, a checksum being calculated over at least a predetermined part of at least one of the data segment and the header segment, and the calculated checksum being stored in a third area of the output register predetermined for the checksum segment, and wherein the bus system is a FlexRay bus system.

15. The method as recited in claim 14, wherein the validity datum is implemented as the toggle bit, the toggle bit being switched over upon each writing of the corresponding data unit.

16. The method as recited in claim 15, wherein the N-bit counters for the data units are each initialized using a different initialization value, and wherein the N-bit counters are each incremented or decremented by one upon each writing of the corresponding data unit.

17. The method as recited in claim 14, wherein the validity datum is implemented as the N-bit counter, the N-bit counter being incremented or decremented by a predetermined counter range upon each writing of the corresponding data unit.

18. The method as recited in claim 17, wherein the N-bit counters for the data units are each initialized using a different initialization value, and wherein the N-bit counters are each incremented or decremented by one upon each writing of the corresponding data unit.

* * * * *

UNITED STATES PATENT AND TRADEMARK OFFICE
CERTIFICATE OF CORRECTION

PATENT NO. : 8,413,017 B2  
APPLICATION NO. : 12/308488  
DATED : April 2, 2013  
INVENTOR(S) : Josef Newald Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 710 days.

Signed and Sealed this  
First Day of September, 2015

Michelle K. Lee  
*Director of the United States Patent and Trademark Office*